US006999801B2

(12) United States Patent
Cheng et al.

(10) Patent No.: US 6,999,801 B2
(45) Date of Patent: Feb. 14, 2006

(54) BASE-DETACHABLE HINGE STRUCTURE FOR MOBILE PHONE

(75) Inventors: Yung-Fa Cheng, Taipei (TW);
Lu-Long Tsao, Taipei (TW);
Kuo-Hsiang Wu, Taipei (TW)

(73) Assignee: Quanta Computer, Inc., (TW)

( * ) Notice: Subject to any disclaimer, the term of this patent is extended or adjusted under 35 U.S.C. 154(b) by 493 days.

(21) Appl. No.: 10/003,629

(22) Filed: Nov. 14, 2001

(65) Prior Publication Data
US 2002/0111186 A1 Aug. 15, 2002

(30) Foreign Application Priority Data
Feb. 15, 2001 (TW) .............................. 90202275 U

(51) Int. Cl.
*H04B 1/38* (2006.01)
(52) U.S. Cl. ................ 455/575.1; 455/90.1; 455/550.1
(58) Field of Classification Search ............ 455/550.1, 455/575.1, 575.3, 575.8, 557, 90.3, 556.1, 455/556.2, 575.6, 90.1; 379/433.13, 433.01, 379/433.05, 433.11, 433, 432, 330, 331
See application file for complete search history.

(56) References Cited

U.S. PATENT DOCUMENTS

| 4,827,082 | A | * | 5/1989 | Horiuchi et al. ........... 174/52.4 |
| 5,001,659 | A | * | 3/1991 | Watabe ........................ 361/681 |
| 5,303,291 | A | * | 4/1994 | Takagi et al. ........... 379/433.13 |
| 5,640,690 | A | * | 6/1997 | Kudrna ..................... 455/575.3 |
| 5,704,094 | A | * | 1/1998 | Hartigan et al. ............... 16/303 |
| 5,732,331 | A | * | 3/1998 | Harms ...................... 455/575.3 |
| 5,827,082 | A | * | 10/1998 | Laine .......................... 439/165 |
| 5,832,079 | A | * | 11/1998 | Rabe ....................... 379/433.13 |
| 5,983,083 | A | * | 11/1999 | Horne ..................... 455/575.3 |
| 5,987,122 | A | * | 11/1999 | Daffara et al. ......... 379/433.13 |
| 5,995,373 | A | * | 11/1999 | Nagai ......................... 361/755 |
| 5,996,178 | A | * | 12/1999 | Murray ........................ 16/303 |
| 6,633,749 | B1 | * | 10/2003 | Kubo et al. .................... 16/355 |
| 6,708,046 | B1 | * | 3/2004 | Takagi ....................... 455/575.3 |
| 2002/0042252 | A1 | * | 4/2002 | Toyoda et al. ................ 455/90 |
| 2002/0069483 | A1 | * | 6/2002 | Savolainen et al. ........... 16/308 |

FOREIGN PATENT DOCUMENTS

CN 1236250 11/1999

* cited by examiner

Primary Examiner—Tilahun Gesesse
(74) Attorney, Agent, or Firm—Perkins Coie LLP

(57) ABSTRACT

A mobile phone with base-detachable hinge structure is provided. The mobile phone compromises a base unit, a display unit, a hinge structure and a protection casing. The hinge structure, which can be attached to and detached from the base unit by means of a fixing device, is detachable from the display unit and the base unit. The design of base-detachable hinge structure in the invention facilitates the assembly and repair of the mobile phone, lest the hinge structures would be damaged during the process of disassembly resulting in discarded base units. As a result, it becomes environmentally friendly that unnecessary waste is reduced and the usefulness of the base unit improved.

6 Claims, 4 Drawing Sheets

BASE-DETACHABLE HINGE STRUCTURE FOR MOBILE PHONE

This application incorporates by reference Taiwanese application Serial No. 90202275, Filed Feb. 15, 2001.

BACKGROUND OF THE INVENTION

1. Field of the Invention

The invention relates in general to a mobile phone, and more particularly to a mobile phone with a base-detachable hinge structure.

2. Description of the Related Art

Along with the busy communication between people, the mobile phone has become an indispensable communication tool for modern people. The mobile phone, being small in size and easy to carry with, enables people to conveniently communicate with each other no matter wherever they are or whenever they want to, and thus meets people's requirements of convenience and efficiency.

Referring to FIG. 1A, an exploded diagram of a conventional mobile phone 100 is illustrated. In FIG. 1A, the mobile phone 100 includes an operation body 102 and a display unit 104, wherein hinge sections 106a and 106b are symmetrically situated at one end of the base unit's top face 107 of the operation body 102 with hinge spindles 108a and 108b symmetrically positioned at hinge sections 106a and 106b respectively. Among which, the operation body 102 normally further includes a number of buttons 114 with which the users in put messages. The flange 110, which corresponds tog hinge sections 106a and 106b, is situated at one end of the display unit 104. The hinge holes 112a and 112b, which correspond to the hinge spindles 108a and 108b respectively, are symmetrically positioned at both sides of the flange 110. In addition, the display unit 104 normally has a Liquid Crystal Display (LCD) displaying messages of the mobile phone 100. After the hinge spindles 108a and 108b having been fit into the hinge holes 112a and 112b, the display unit 104 will be able to be closed to the operation body 102 or opened from it as illustrated in FIG. 1B.

It is noteworthy that in order to facilitate the signal transmission between the LCD 116 and buttons 114 as in FIG. 1A, a circuit board 120 (as shown in dotted lines in FIG. 1B) can be installed in the mobile phone 100 as illustrated in FIG. 1B in practical application. The circuit board 120 must be located inside the operation body 102, the flange 110 and the display unit 104 to facilitating electric communication between the LCD 116 and buttons 114 as in FIG. 1A and assuring a normal operation. Since the display unit 104 closes to and opens from the operation body so frequently, besides, the flexibility of the circuit board is normally not good enough, the circuit board 120 needs to be equipped with a bending 122 to enhance its flexibility lest the circuit board 120 will break easily. If the display unit closes to and opens from the operation body frequently, the bending 122 will become fragile. As a consequence, breakage easily occurs at the bending 122 thus the service life of the circuit board 120 is shortened.

Generally speaking, the operation body 102, hinge sections 106a and 106b, and hinge spindles 108a and 108b are formed in unity, so are the display unit 104 and the flange 110. Since the structures of the two parts are both hard, it is difficult to assemble them. However, hinge spindles 108a and 108b fit into hinge holes 112a and 112b tightly after assembly has been done. When the mobile phone 100 is out of order and needs to be repaired, normally the display unit 104 has to be detached from the operation body 102 in order to fix the problems. Since the hinge spindles 108a and 108b fit so tightly into the hinge holes 112a and 112b, the user needs exert force in order to separate them apart. Therefore the structures of hinge sections 106a and 106b are always found to have been damaged after the display unit 104 is detached from the operation body 102. Since the structure of the operation body 102, hinge sections 106a and 106b, and hinge spindles 108a and 108b are formed in unity, the operation body 102 cannot be used again and needs to be thrown away if it is damaged. It is not only wasteful, but also environmentally unfriendly. Besides, the user has to buy a new operation body. At least, the user has to buy a shell of the operation body 102, the so-called base unit of a mobile phone, to recover its original integral outlook, which is a waste of money.

SUMMARY OF THE INVENTION

It is therefore an object of the invention to provide a mobile phone with base-detachable hinge structure. The design of base-detachable hinge structure facilitates the assembly and repair of the mobile phone, lest the hinge structures would be damaged during the process of disassembly resulting in discarded base units. As a result, it becomes environmentally friendly that unnecessary waste is reduced and the usefulness of the base unit improved.

According to the object of the invention, a mobile phone with base-detachable hinge structure is provided, compromising a base unit, a display unit, a hinge structure and a protection casing, wherein the display unit has the first hinge hole and the first hinge spindle while the hinge structure has the second hinge spindle to fit into the first hinge hole joining up the hinge structure with the display unit. Among which, the hinge structure is attached to and detached from the base unit by means of a fixing device; the protection casing, which is formed by joining up the top protection casing with the root protection casing, has the second hinge hole into which the first hinge spindle fits joining up the protection casing with the display unit.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 2A:
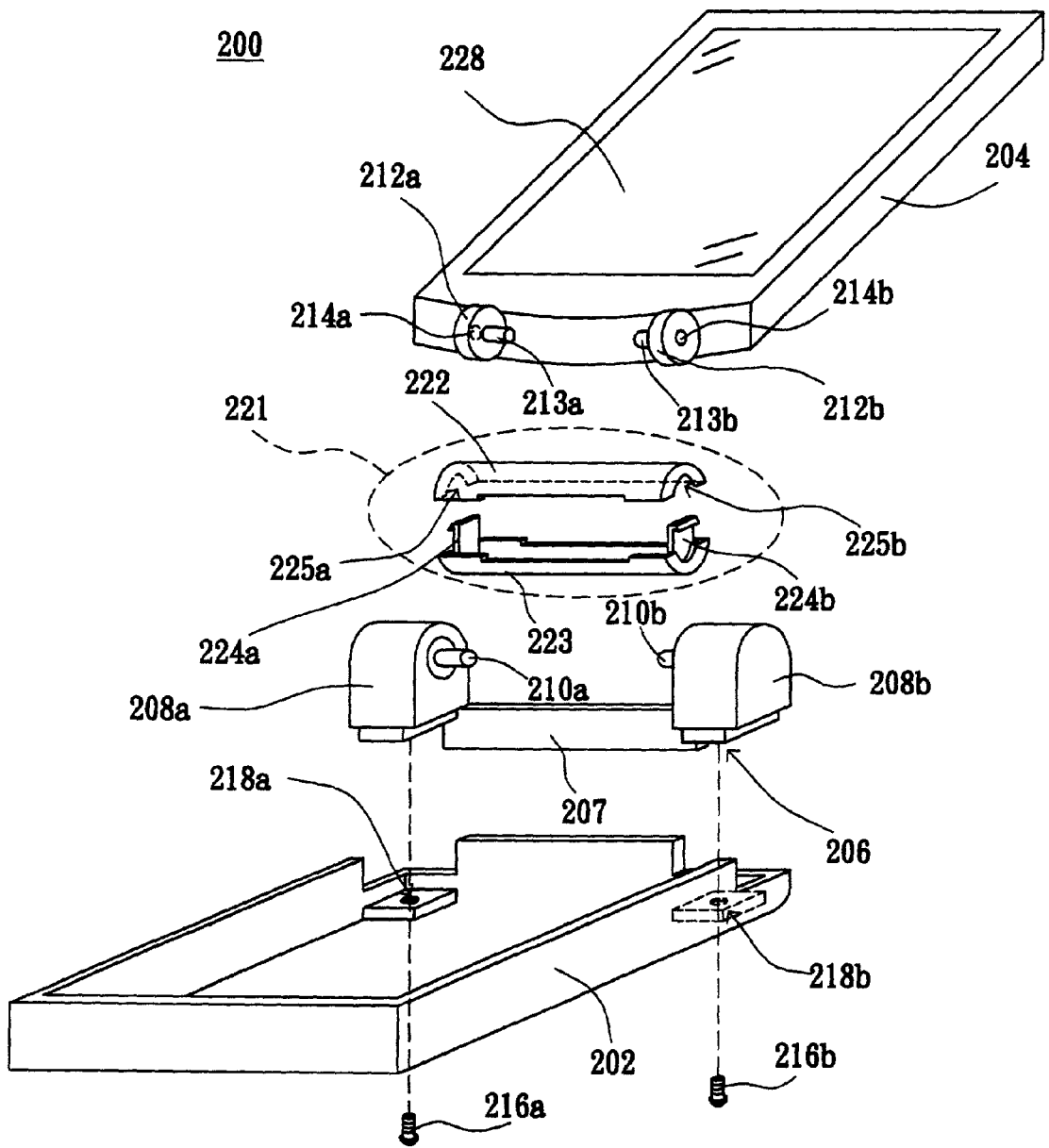
FIG. 2A is an exploded diagram of a mobile phone with base-detachable hinge structure according to a preferred embodiment of the invention.
Figure 2B:
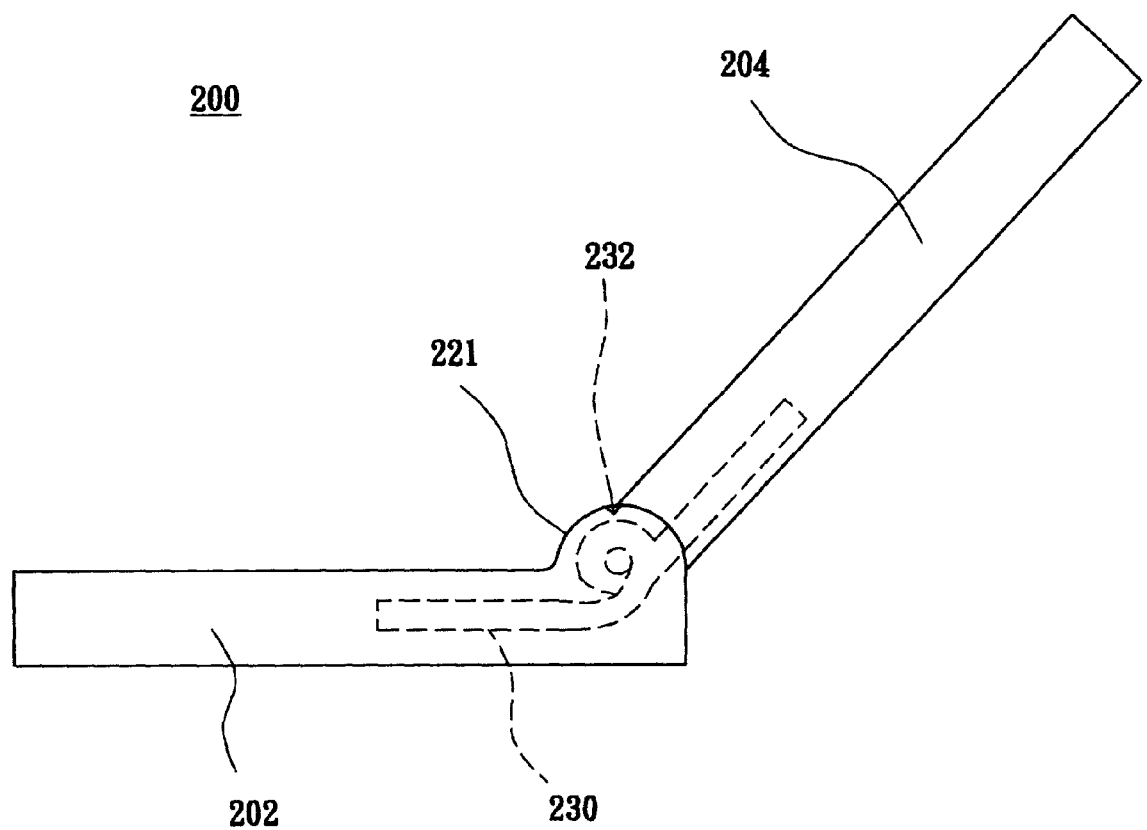
FIG. 2B is a side elevation of assembly according to the mobile phone as in FIG. 2A.

A design of base-detachable hinge structure is provided in the invention. The hinge structure can be attached to and detached from the base unit by means of a fixing device. Not only the assembly and repair of the mobile phone has become easier, but also avoid discarding the base unit whose hinge structure is damaged during the process of disassembly. As a result, it becomes environmentally friendly that unnecessary wastes are reduced and the usefulness of the base unit improved. Its practical embodiment is as follows:

Referring to FIG. 2A, an exploded diagram of a mobile phone with base-detachable hinge structure according to a preferred embodiment of the invention is shown. In FIG. 2A, the mobile phone 200 includes a base unit 202, a display unit 204 and a hinge structure 206. The hinge structure 206 comprises a connection board 207, hinge sections 208a and 208b, hinge spindle 210a and 210b, wherein hinge sections 208a and 208b are symmetrically positioned at the two ends of the connection board 207; while hinge spindles 210a and 210b are symmetrically positioned at two opposite inner sides of hinge sections 208a and 208b respectively. Among which, flanges 212a and 212b, which corresponds to hinge sections 208a and 208b, are symmetrically situated at one end of the display unit 204; hinge holes 214a and 214b, which corresponds to hinge spindles 210a and 211b respectively, are symmetrically positioned at the two outer sides of flanges 212a and 212b; while hinge spindles 213a and 213b are symmetrically positioned at the tow opposite inner sides of flanges 212a and 212b respectively. It is noteworthy that the base unit is normally has a large number of buttons (not shown in the diagram) through which messages are inputted. The display unit 204 has a Liquid Crystal Display (LCD) 228 showing the messages of the mobile phone 200. Moreover, the display unit can be closed to and opened from the base unit 202 after spindle 210a and 210b having been fit into hinge holes 214a and 214b as illustrated in FIG. 2B.

The hinge structure 206 in the invention is attached to or detached from the base unit 202 by means of a fixing device. The fixing device can be screws 216a and 216b for instance. Screws 216a and 216b, passing through the screw holes 218a and 218b on the base unit 202, are fastened to the tooling holes on the hinge section 208 (not shown in the diagram). If the hinge structure 206 is to be detached from the base unit 202, the user just needs to unscrew screws 216a and 216b from screw holes 218a and 218b, and the tooling holes. The assembly and disassembly is thus made easy.

The protection casing (as is enclosed with dotted lines in FIG. 2A) includes a top protection casing 222 and a root protection casing 223, wherein the root protection casing 223 has click hooks 224a and 224b to fasten the clips (not shown in the diagram) of the top protection casing forming the protection casing 221 and hinge holes 225a and 225b positioned at the two sides of the protection casing 221 respectively. Furthermore, hinge spindles 213a and 213b fit into hinge holes 225a and 225b respectively fastening the protection casing to flanges 212a and 212b. In another aspect, the protection casing 221 can be disassembled into the top protection casing 222 and the root protection casing 223 and detached from flanges 212a and 212b as long as click hooks 224a and 224b are loosened from the clips. The assembly and disassembly is easy and convenient.

When the mobile phone 200 runs out of order, it cannot be repaired before the display unit 204 is detached from the base unit 202. Firstly, detach the hinge structure 206 from the base unit 202. Next, detach the hinge structure 206 from the display unit 204. Because hinge spindles 210a and 210b fit into hinge holes 214a and 214b so tightly, the hinge structure 206 may be damaged after having been detached from the base unit 202. Since the hinge structure 206 has been detached from the base unit 202, the user only needs to change a new hinge structure instead of replacing the base unit 202 with a new one. Thus unnecessary wastes are reduced.

Figure 1A:
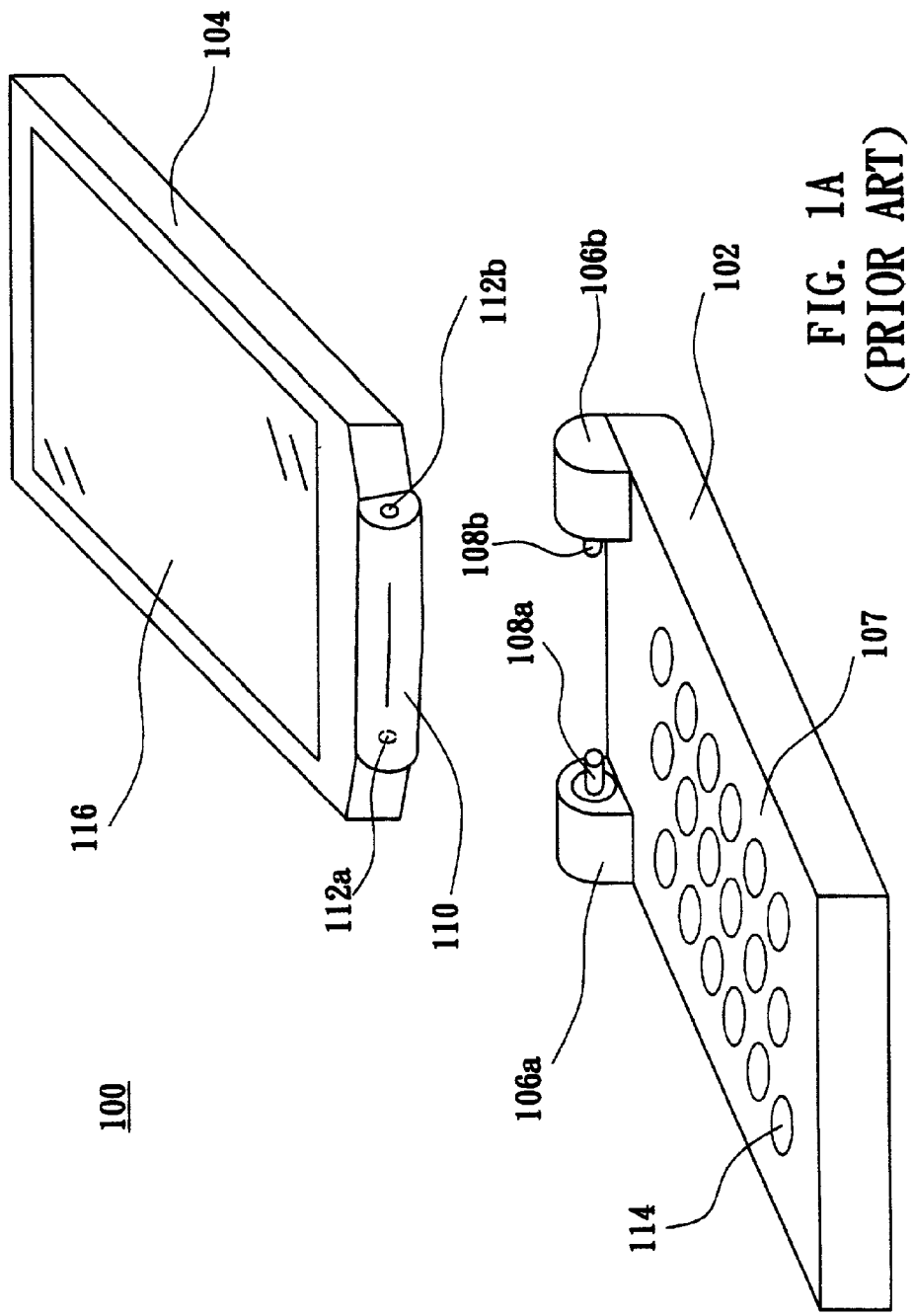
FIG. 1A is an exploded diagram of a conventional mobile phone.
Figure 1B:
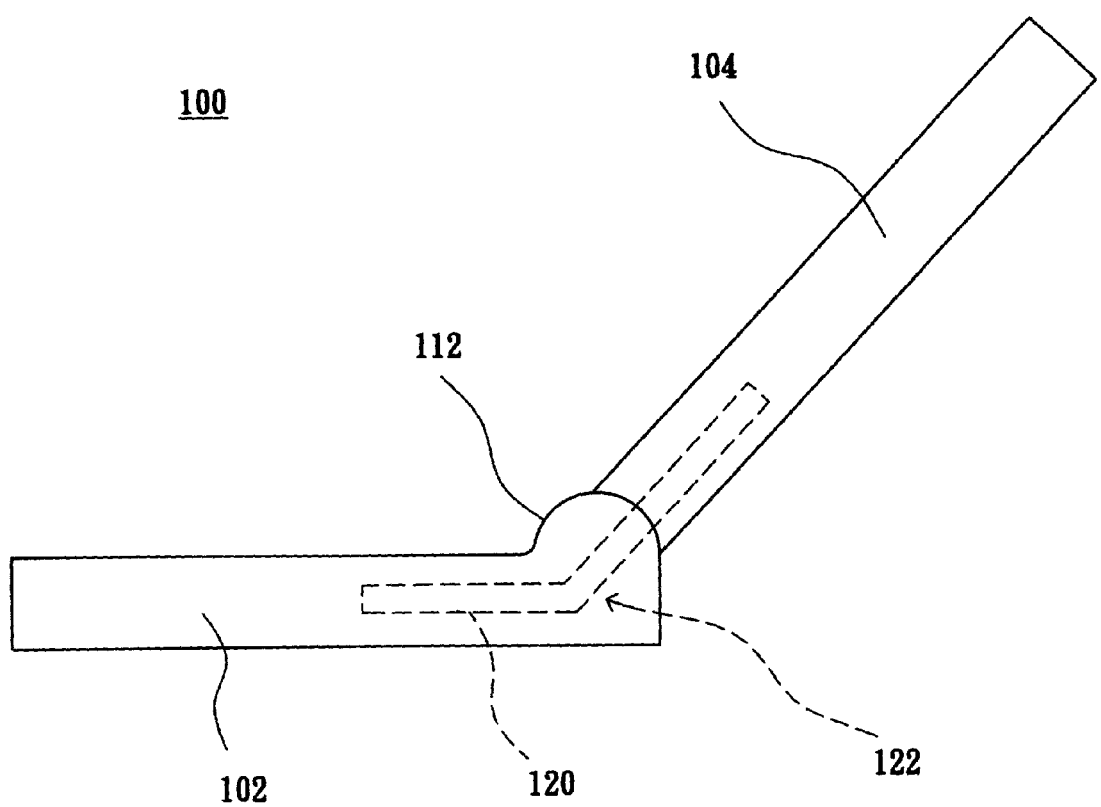
FIG. 1B is a side elevation of assembly according to the mobile phone as in FIG. 1A.

In order to facilitate the signal transmission between the LCD 228 and the buttons as in FIG. 2A, a flexible circuit board 230 (as shown in dotted lines in FIG. 2B) can be installed in the mobile phone 200 as illustrated in FIG. 1B in practical application. The flexible circuit board 230 can be made of flexible materials such that its flexibility is even better than the circuit board 120 as in FIG. 1B. The flexible circuit board 230 must be located inside the base unit 202, the protection casing 221 and the display unit 204 to facilitating electric communication between the LCD 228 and buttons and assuring a normal operation. Since the display unit 204 closes to and opens from the base unit 202 so frequently, the flexible circuit board 230 could easily break because of frequent bending. According to the invention, the flexible circuit board 230 is particularly designed to have a winding 232 to enhance the flexibility and avoid breaking so as to prolong the service life of the flexible circuit board 230.

The mobile phone with base-detachable hinge structure is disclosed in examples of preferred embodiments of the invention. The base-detachable design not only facilitates the assembly and repair of the mobile phone, but also avoids discarding the base unit whose hinge structure is damaged during the process of disassembly. As a result, it becomes environmentally friendly that unnecessary wastes are reduced and the usefulness of the base unit improved.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile phone with base-detachable hinge structure, comprising:
    a base unit;
    a display unit, which comprises a first hinge hole and a first hinge spindle;
    a hinge structure, detachably fixed on the base unit, the hinge structure comprising a second hinge spindle to fit into the first hinge hole joining up the hinge structure with the display unit, wherein the hinge structure is attached to and detached from the base unit by means of a fixing device, wherein when the display unit is closed to and opened from the base unit, the first hinge hole of the display unit accordingly rotates relative to the second hinge spindle of the hinge structure fixed on the base unit; and
    a protection casing, which is formed by joining up the top protection casing forming a second hinge hole into which the first hinge spindle fits joining up the protection casing with the display unit.

2. The mobile phone according to claim 1, wherein the fixing device is a screw, passing through a screw hole on the base unit, is fastened to the tooling hole on the hinge structure.

3. The mobile phone according to claim 1, wherein the display unit further includes:
    a Liquid Crystal Display (LCD); and
    a flange, which is situated at one end of the display unit, having the first hinge hole and the first hinge spindle.

4. The mobile phone according to claim 3, wherein the flange and the display are formed in unity.

5. The mobile phone according to claim 1, wherein the mobile phone further comprises:
    a flexible circuit board, which is inside the protection casing, comprising a winding to enhance the flexibility of the flexible circuit board.

6. The mobile phone according to claim 5, wherein the flexible circuit board is made of a flexible material.

* * * * *

UNITED STATES PATENT AND TRADEMARK OFFICE
CERTIFICATE OF CORRECTION

| | | |
|---|---|---|
| PATENT NO. | : 6,999,801 B2 | Page 1 of 1 |
| APPLICATION NO. | : 10/003629 | |
| DATED | : February 14, 2006 | |
| INVENTOR(S) | : Cheng, Yung-Fa, Tsao, Lu-Long and Kuo-Hsiang | |

It is certified that error appears in the above-identified patent and that said Letters Patent is hereby corrected as shown below:

Title, Line 54, "Base-Detachable Hinge Structure For Mobile Phone" should read --Mobile Phone with Base-Detachable Hinge Structure--.

Signed and Sealed this

Eighth Day of August, 2006

JON W. DUDAS
*Director of the United States Patent and Trademark Office*